United States Patent
Trentin et al.

(10) Patent No.: US 10,422,170 B2
(45) Date of Patent: Sep. 24, 2019

(54) DUAL PIVOT LATERALLY TRANSLATING HINGES

(71) Applicant: Ford Global Technologies LLC, Dearborn, MI (US)

(72) Inventors: Daniel Trentin, Ivanhoe (AU); Dave Spink, Jan Juc (AU)

(73) Assignee: Ford Global Technologies LLC, Dearborn, MI (US)

(*) Notice: Subject to any disclaimer, the term of this patent is extended or adjusted under 35 U.S.C. 154(b) by 67 days.

(21) Appl. No.: 15/897,411

(22) Filed: Feb. 15, 2018

(65) Prior Publication Data

US 2018/0291658 A1 Oct. 11, 2018

(30) Foreign Application Priority Data

Apr. 7, 2017 (CN) .......................... 2017 1 0225487

(51) Int. Cl.
| | |
|---|---|
| *B60J 5/00* | (2006.01) |
| *E05D 3/14* | (2006.01) |
| *E05D 3/10* | (2006.01) |
| *E05D 5/06* | (2006.01) |

(52) U.S. Cl.
CPC ................ *E05D 3/147* (2013.01); *B60J 5/00* (2013.01); *E05D 3/10* (2013.01); *E05D 3/14* (2013.01); *E05D 5/062* (2013.01); *E05Y 2201/218* (2013.01); *E05Y 2201/224* (2013.01); *E05Y 2201/636* (2013.01); *E05Y 2201/696* (2013.01); *E05Y 2201/70* (2013.01); *E05Y 2201/702* (2013.01); *E05Y 2201/71* (2013.01); *E05Y 2201/712* (2013.01); *E05Y 2900/531* (2013.01)

(58) Field of Classification Search
CPC .. E05D 3/147; E05D 3/10; E05D 3/14; E05D 5/062; B60J 5/00; E05Y 2201/218; E05Y 2201/224; E05Y 2201/636; E05Y 2201/696; E05Y 2201/70; E05Y 2201/702; E05Y 2201/71; E05Y 2201/712; E05Y 2900/531
See application file for complete search history.

(56) References Cited

U.S. PATENT DOCUMENTS

| | | | |
|---|---|---|---|
| 4,110,934 A | * | 9/1978 | Zens ..................... E05D 15/101 296/155 |
| 6,997,504 B1 | | 2/2006 | Lang et al. |
| 7,328,484 B2 | | 2/2008 | Salice |
| 7,669,908 B2 | | 3/2010 | Townson |

(Continued)

FOREIGN PATENT DOCUMENTS

| | | |
|---|---|---|
| FR | 2736380 | 1/1997 |
| FR | 2927350 | 8/2009 |

*Primary Examiner* — Lori L Lyjak
(74) *Attorney, Agent, or Firm* — Vichit Chea; Kolitch Romano LLP

(57) ABSTRACT

Dual pivoting laterally translating hinges that attach between a stationary first substrate such as a vehicle body, and a rotating second substrate such as a vehicle door, and extend laterally when the second substrate is rotated. In some examples, the hinges include a knuckle and leadscrew mechanism that changes the hinge geometry when the second substrate is rotated, causing the leadscrew to rotate by either a set of gears or a rack and pinion. In some further examples, the hinges include a jackscrew that changes length as the second substrate is rotated, causing the hinge to extent laterally.

20 Claims, 10 Drawing Sheets

(56) References Cited

U.S. PATENT DOCUMENTS

| | | | |
|---|---|---|---|
| 7,980,621 B2 | 7/2011 | Elliott et al. | |
| 9,120,577 B1* | 9/2015 | Baic | B64D 29/06 |
| 2005/0086770 A1* | 4/2005 | Watson | E05D 3/127 |
| | | | 16/334 |
| 2005/0212325 A1* | 9/2005 | Rangnekar | E05D 3/127 |
| | | | 296/146.12 |
| 2009/0070960 A1* | 3/2009 | Elliott | E05D 3/127 |
| | | | 16/334 |
| 2009/0072582 A1* | 3/2009 | Elliott | E05C 17/203 |
| | | | 296/146.11 |
| 2009/0106940 A1* | 4/2009 | Greenbank | E05D 3/127 |
| | | | 16/367 |
| 2012/0192492 A1* | 8/2012 | Cutting | E05C 17/203 |
| | | | 49/394 |
| 2012/0324793 A1* | 12/2012 | Abbasi | B62D 33/0273 |
| | | | 49/168 |
| 2016/0145922 A1* | 5/2016 | Wickliffe | E05D 11/1042 |
| | | | 296/146.12 |
| 2016/0362926 A1* | 12/2016 | Dey | E05D 11/1014 |
| 2018/0087304 A1* | 3/2018 | Bauer | E05F 15/643 |

* cited by examiner

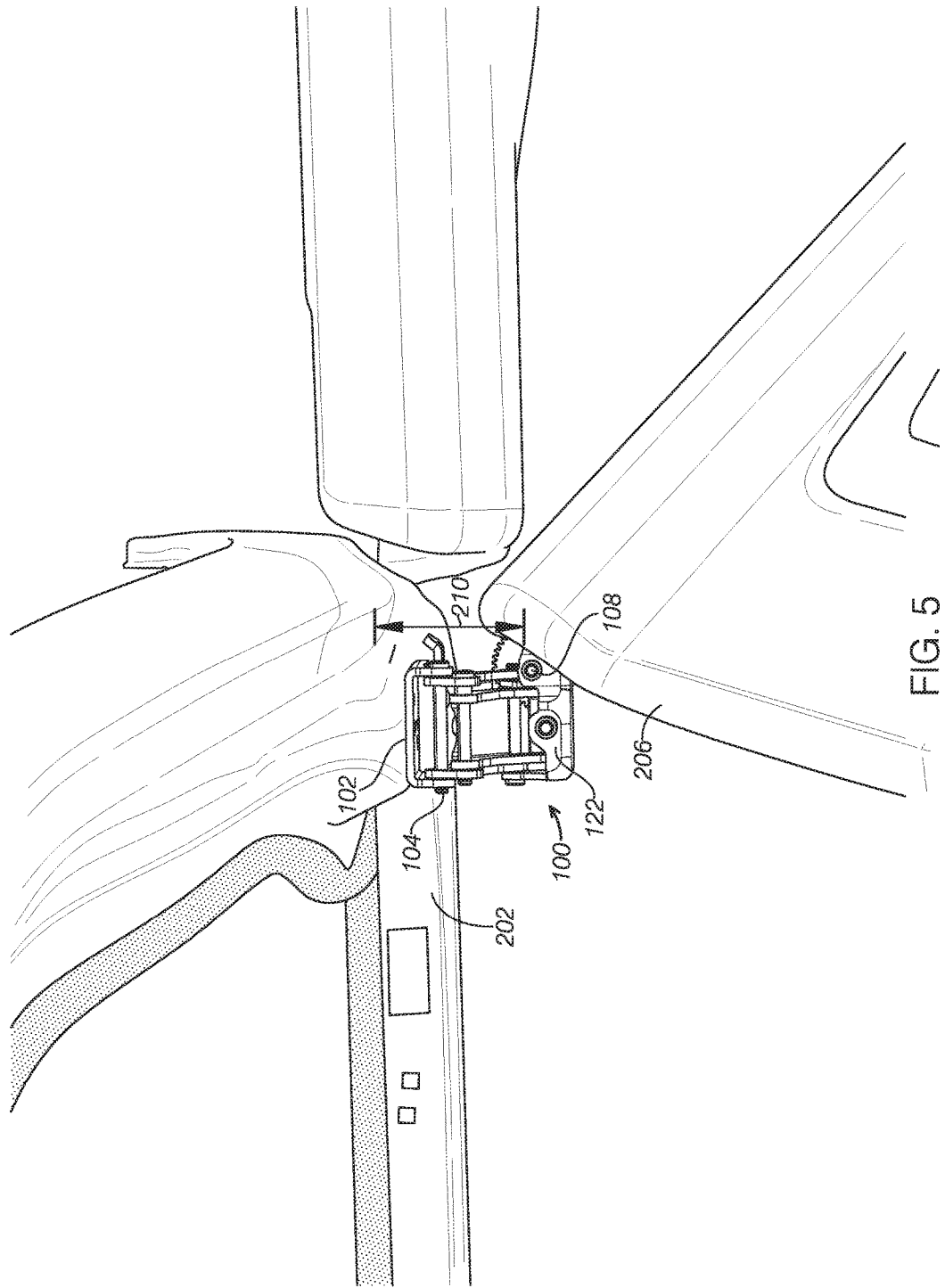

DUAL PIVOT LATERALLY TRANSLATING HINGES

RELATED APPLICATION

This application claims the benefit of Chinese Patent Application No.: CN 201710225487.7 filed on Apr. 7, 2017, the entire contents thereof being incorporated herein by reference.

FIELD

The present disclosure relates generally to hinges for vehicle closures. In particular, hinges that include both vertical and horizontal pivot axes that produce lateral translation in conjunction with normal closure rotation, are described.

BACKGROUND

It is desirable for vehicle closures, especially those on utility vehicles such as trucks and SUVs, to be able to open completely clear of the body opening and thereby provide unobstructed access to a vehicle's interior. Such access allows large items, up to the size of the opening, to be more easily placed into and removed from the vehicle. The ability of a closure to clear its body opening completely is generally determined by the configuration of the hinges used to attach and hang the closure to the vehicle body.

For styling and aerodynamic benefits, many vehicles require concealment of hinges when the closures are shut. To meet this requirement, the hinge must be contained inboard of the closure outer panel and within the depth of the vehicle body. For concealed hinges that have a single pivot axis, it is highly likely that the door's travel will be limited to approximately 90 degrees. This is due to 2 major factors, a) the closure cutline swing path clashing with the actual hinge, and b) the section of the closure outboard of the pivot axis having an inboard component of travel when exceeding 90 degrees.

As a result, if the door travels past 90 degrees, the door will come into contact with the side of the vehicle body (or more preferably the door is limited in travel prevent it from coming into contact with the vehicle body). This is due to the hinge pivot point possessing a minimal rotational radius and being positioned so that an exterior-facing portion of the door is placed ahead of the hinge's rotational path, where it can meet a corresponding exterior-facing portion of the vehicle body within the hinge's rotational path. In this position, many vehicle doors fail to completely clear the doorway; a door travel in excess of 90 degrees is needed to completely clear the doorway.

A simple hinge can be employed to provide greater than 90 degrees of travel if the hinge pivot point is placed outside the surface of the vehicle body and door when in a closed position, provided that no portion of the door and body side curve or protrude out past the hinge pivot. In this position, although the rotational radius of the hinge remains unchanged, no portion of the door is ahead of the hinge's rotational path. While this hinge configuration allows the vehicle doors to travel well past 90 degrees and is compact in size, the pivot portion of the hinge is visible from the vehicle exterior, leaving it vulnerable to potential damage and forming a snag hazard. A visible hinge is also often undesirable from an aesthetic point of view.

Various hinges have been developed over the years to allow vehicle doors to exceed 90 degrees of travel while providing a clean appearance with no portion of the hinge visible when the door is closed. For example, a "gooseneck" hinge, so named because its shape resembles a curved goose's neck, is used to move the door pivot point further away from the door and into the vehicle body and/or frame. This effectively increases the rotational radius of the hinge so that the door rotates around a wide enough path so that the vehicle body is not encountered in the rotational path until well past 90 degrees of travel. The hinge's relatively large radius provides a degree of outward lateral translation while the door is opening.

However, gooseneck hinges are not entirely satisfactory for the range of applications in which they are employed. For example, gooseneck hinges, because they move the door pivot point further away from the door outer surface, require relatively deep cuts into the adjacent body and/or frame. These cuts can potentially weaken the frame structure, thus necessitating structural reinforcement, which adds weight and cost to the vehicle construction. Further, employing a gooseneck hinge places limits on the configuration of the adjacent body and/or frame, as it will need to be accommodated in the door closed position; a gooseneck hinge cannot be employed when there is insufficient adjacent vehicle structure.

Thus, there exists a need for hinges useful for vehicle applications that improve upon and advance the design of known hinges that allow vehicle doors to clear adjacent body structure and open past 90 degrees. Examples of new and useful hinges relevant to the needs existing in the field are discussed below.

Disclosure addressing one or more of the identified existing needs is provided in the detailed description below. French patent publication FR2736380 is relevant to parallel dual pivoting laterally translating hinges and discloses a hinge with dual pivot points that translates laterally by action of a set of gears that surround and are attached to one pivot point.

SUMMARY

According to a first aspect of the disclosed invention, a hinge is comprised of a first attachment plate configured to secure to a first substrate; a first pivot with a longitudinal axis secured to the first attachment plate; a second attachment plate configured to secure to a second substrate; a second pivot with a longitudinal axis oriented orthogonally from the first pivot longitudinal axis and secured to the second attachment plate, the second pivot configured so that the second attachment plate rotates about the second pivot longitudinal axis; and a drive mechanism mechanically connected to the second attachment plate and the first pivot, and configured to impart a load to the first pivot to cause a rotation of the first pivot as the second attachment plate rotates so that a force resulting from a rotation of the first pivot causes the second attachment plate to translate away from the first attachment plate.

In one embodiment, the drive mechanism includes a plurality of intermeshing gears to mechanically connect the first pivot with the second pivot, and the rotation of the second attachment plate is imparted to the first pivot via the plurality of intermeshing gears.

In another embodiment, the drive mechanism further comprises a knuckle mechanically attached to the first pivot; a leadscrew engaged with the knuckle and mechanically connected to the second pivot via the gears so that the leadscrew rotates within the knuckle as the second attachment plate rotates, causing the knuckle to move along the leadscrew's axis of rotation.

In another embodiment, the knuckle is rotatably attached to a first end of a linkage arm, the linkage arm further having a second end distal from the first end, where the second end is mechanically attached to the first pivot.

In yet another embodiment, the second end of the linkage arm is rotatably attached to a lift arm with a first end and a second end located distal from the first end, the lift arm being rotatably attached to the first pivot on its first end.

In another embodiment, the drive mechanism further comprises a drive mechanism bracket, the drive mechanism bracket having a first bracket end rotatably attached to the second pivot, and a second bracket end distal from the first bracket end rotatably attached to the second end of the lift arm.

In another embodiment, the first attachment plate further comprises a socket; and the second attachment plate further comprises a hook. The hook projection engages into the socket when the plane of the second attachment plate is brought into a parallel position with the plane of the first attachment plate.

In another embodiment, the drive mechanism is further comprised of a plurality of gears, with one of the plurality of gears being mechanically connected to the second attachment plate, and a second one of the plurality of gears being mechanically connected to the leadscrew.

In yet another embodiment, the drive mechanism is further comprised of a rack that is mechanically connected to the second attachment plate, and a pinion that is mechanically connected to the leadscrew, wherein rotating the second attachment plate causes the rack to rotate the pinion.

In still another embodiment, the drive mechanism is further comprised of a jackscrew with a first end mechanically attached to the first attachment plate and a second end attached to a universal joint, and the universal joint is mechanically attached to the second attachment plate.

According to a second aspect of the disclosed invention, a hinge for securing a door to a substrate comprises a first attachment plate secured to the substrate; a second attachment plate secured to the door; a first pivot with a longitudinal axis mechanically attached to the first attachment plate so that the longitudinal axis of the first pivot is substantially parallel to the plane of the first attachment plate; a lift arm with a first end and a second end located distal from the first end, the first end of the lift arm being rotatably attached to the first pivot so that the lift arm rotates up away from the plane of the first attachment plate, the first end further including a linkage pivot point and the second end further including a bracket pivot point; a linkage arm with a first end and a second end located distal from the first end, the second end being rotatably attached to the linkage pivot point and the first end including a knuckle pivot point; a drive mechanism comprised of a drive mechanism bracket with a first end rotatably secured to a second pivot, the second pivot having a longitudinal axis oriented orthogonal from the first pivot longitudinal axis, and a second end located distal from the first end and rotatably secured to the bracket pivot point; a threaded knuckle rotatably attached to the knuckle pivot point; a threaded leadscrew with a longitudinal axis, rotatably secured to the drive mechanism bracket and passing through the knuckle so that rotating the lead screw causes the knuckle to move along the leadscrew longitudinal axis; and one or more gears secured to the drive mechanism bracket and configured to rotatably drive the leadscrew. The second attachment plate is rotatably attached to the second pivot and is configured so that rotating the door causes the second attachment plate to rotate about the second pivot and impart a rotational motion to the one or more gears, thereby causing the leadscrew to be rotatably driven, and thereby further causing a load to be placed upon the lift arm, resulting in a torque that causes the lift arm to rotate away from the plane of the first attachment plate.

In one embodiment, the first attachment plate further comprises a socket, and the second attachment plate further comprises a hook. The hook projection engages into the socket when the door is brought into a closed position against the substrate.

In another embodiment, the one or more gears are comprised of a rack that is mechanically attached to the second attachment plate, and a pinion that is attached to the leadscrew.

According to a third aspect of the disclosed invention, a vehicle comprises a vehicle body; a vehicle door movably secured to the vehicle body by at least two hinges, each hinge further comprising a first attachment plate secured to the vehicle body with a first pivot; a drive mechanism with a second pivot oriented orthogonally from the first pivot, the drive mechanism being rotatably attached to the first pivot; and a second attachment plate secured to the vehicle door and rotatably attached to the second pivot, the second attachment plate configured to drive the drive mechanism when it rotates. Rotating the door causes the second attachment plate of each hinge to rotate about its corresponding second pivot, causing the vehicle door to move laterally relative to the vehicle body as it rotates.

In one embodiment, the drive mechanism is comprised of a lift arm with a first end and a second end located distal from the first end, the first end of the lift arm being rotatably attached to the first pivot so that the lift arm rotates up away from the plane of the first attachment plate when a load is placed upon the first end of the lift arm, the first end further including a linkage pivot point and the second end further including a bracket pivot point; a linkage arm with a first end and a second end located distal from the first end, the first end including a knuckle pivot point and the second end being rotatably attached to the linkage pivot point; a drive mechanism bracket with a first end rotatably secured to a second pivot, the second pivot having a longitudinal axis oriented orthogonal from the first pivot longitudinal axis, and a second end located distal from the first end and rotatably secured to the bracket pivot point; a threaded knuckle rotatably attached to the knuckle pivot point; a threaded leadscrew with a longitudinal axis, rotatably secured to the drive mechanism bracket and passing through the knuckle so that rotating the leadscrew causes the knuckle to move along the leadscrew longitudinal axis, imposing a load upon the lift arm via the linkage arm, and thereby causing the lift arm to rotate away from the plane of the first attachment plate.

In another embodiment, the drive mechanism further comprises one or more gears secured to the drive mechanism bracket and configured to rotatably drive the leadscrew.

In another embodiment, the second attachment plate rotating about the second pivot imparts a rotational motion to one of the one or more gears, thereby causing the leadscrew to be rotated.

In yet another embodiment, the drive mechanism further comprises a rack that is mechanically attached to the second attachment plate, and a pinion that is attached to the leadscrew, wherein rotating the second attachment plate about the second pivot causes the leadscrew to be rotated.

In another embodiment, the drive mechanism further comprises a jackscrew with a first end mechanically attached to the first attachment plate and a second end attached to a universal joint; the universal joint is mechanically attached to the second attachment plate; and rotating the second attachment plate imparts a rotational motion to the universal joint, causing the jackscrew to change in length.

In still another embodiment, the first attachment plate further comprises a socket; and the second attachment plate further comprises a hook. The hook projection engages into the socket when the door is brought into a closed position against the substrate.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

FIG. 5 is a top view of the dual pivoting laterally translating hinge shown in FIG. 4A depicting the lateral clearance provided by the hinge as it extends.

Figure 1A:
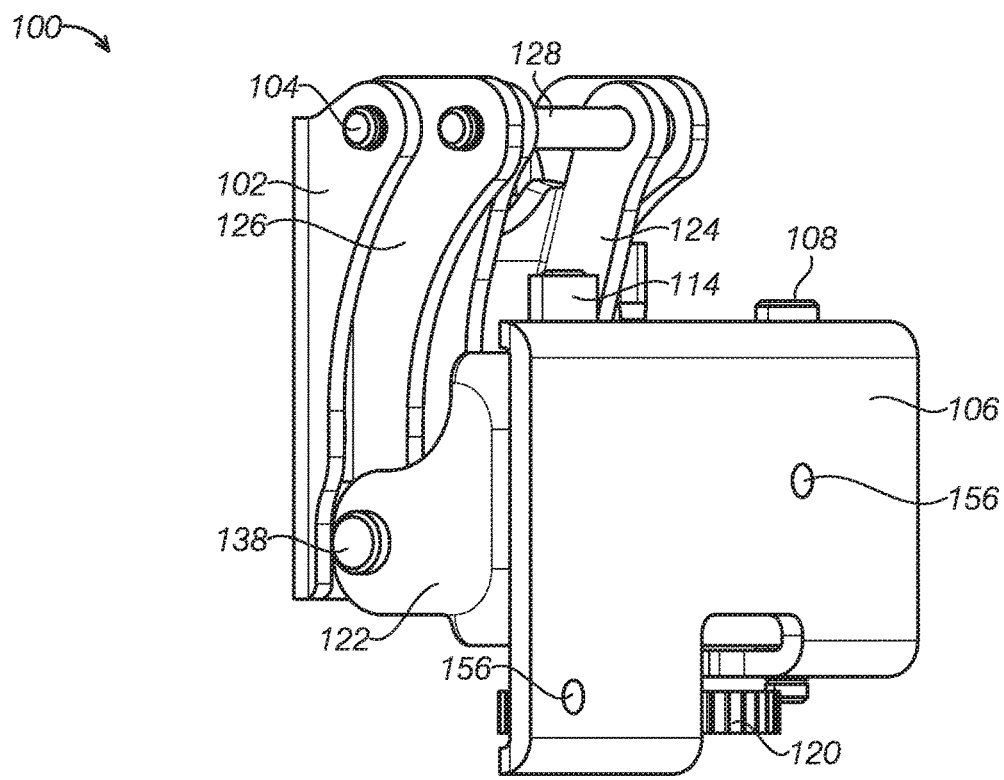
FIG. 1A is a front-side perspective view of a first example of a first example dual pivoting laterally translating hinge.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

The disclosed dual pivoting laterally translating hinges will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various dual pivoting laterally translating hinges are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

With reference to FIGS. 1A-5, a first example of a dual pivoting laterally translating hinge, hinge 100, will now be described. Hinge 100 functions to secure a panel, such as a vehicle door, to a substrate, such as a vehicle frame or body, in such a way that rotating the secured panel imparts a rotational force to a mounting plate of hinge 100. In turn, this rotational force actuates a drive mechanism within hinge 100 that causes hinge 100, when the mounting plate is held in a fixed rigid plane, to extend laterally away from the substrate. In vehicular applications, this results in the vehicle door slating away from the vehicle body as it rotates, potentially providing greater clearance between the vehicle door and surrounding portions of the vehicle. This additional clearance can allow the vehicle door to open to a wider angle than would be possible with a conventional concealed hinge, where the door's travel would otherwise be limited by contact with the vehicle body. The reader will appreciate from the figures and description below that hinge 100 addresses shortcomings of conventional concealed vehicle hinges.

Further, the reader should appreciate that although vehicles are described herein as the primary application for hinge 100, this in no way is intended to be limiting. Hinge 100 can find use in a variety of different applications, both vehicular and non-vehicular. Some examples of various applications could include vehicle lift gates, swing gates and compartment doors, as well as building doors and access panels, or any other application where a planar substrate needs to pivot relative to a second planar substrate, and lateral translation combined with rotational movement is desired.

In this application, where a part is "mechanically attached" to another part, it means that the part is attached in such a fashion that it is capable of transmitting, imparting or applying force to the part to which it is attached, and is not otherwise meant to imply a particular method of attaching the parts in question together.

For example, hinge 100 presents in a compact package that requires virtually no protrusion into the vehicle body and/or frame structure, in contrast to goose-neck type hinges. Because hinge 100 folds into itself as the vehicle door closes, it shrinks in size to take up a volume roughly comparable to a conventional concealed hinge that doesn't allow for lateral translation and clearance of the vehicle body. Thus, hinge 100 provides the benefits of a gooseneck hinge—a large swing radius that provides lateral translation away from the vehicle body and allows the door to open past 90 degrees, as well as completely hiding the hinge when the vehicle door is closed—with the size and package benefits of a conventional hinge, allowing the hinge to fit into the space between the door and the vehicle, without intruding into the vehicle body and/or frame.

Figure 1B:
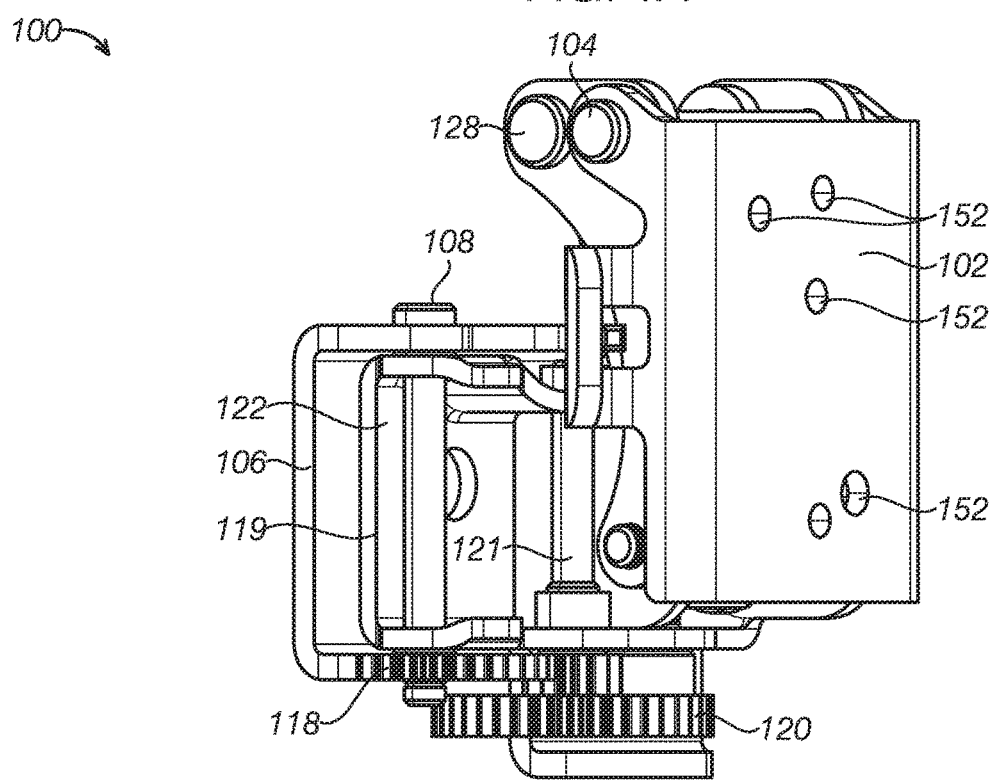
FIG. 1B is a rear-side perspective view of the dual pivoting laterally translating hinge shown in FIG. 1A depicting the attachment plate for attaching the hinge to a substrate as well as the hinge drive mechanism.
Figure 1C:
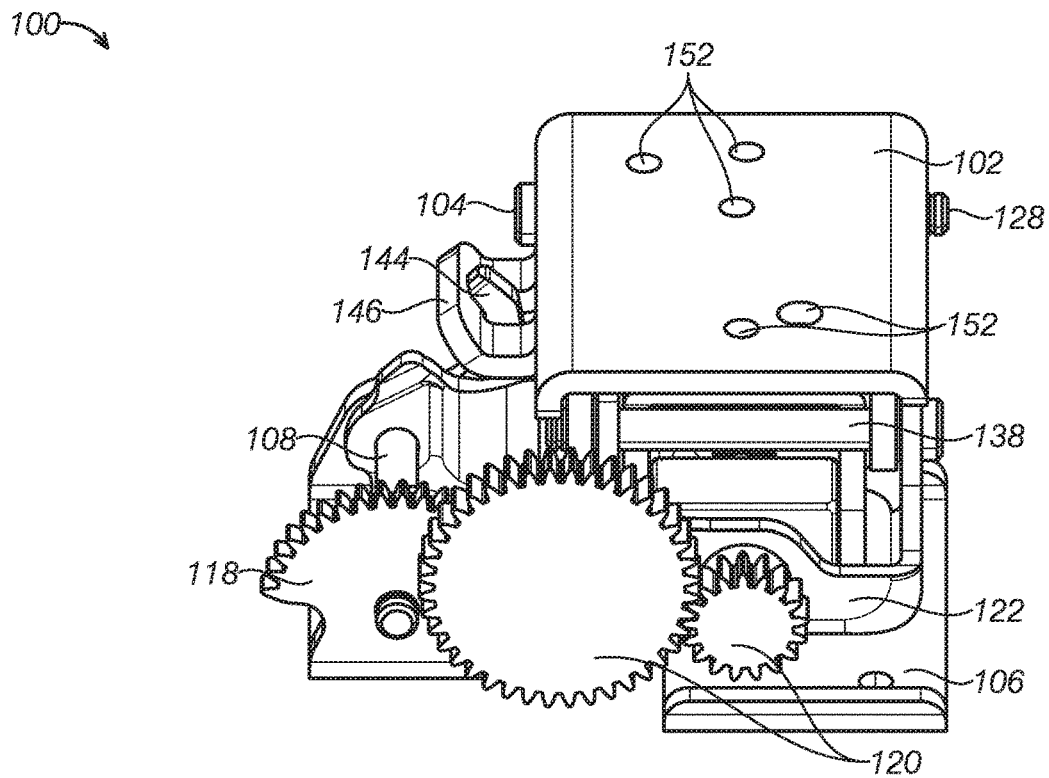
FIG. 1C is a bottom perspective view of the dual pivoting laterally translating hinge shown in FIG. 1A further depicting the drive mechanism components of the preferred embodiment.
Figure 1D:
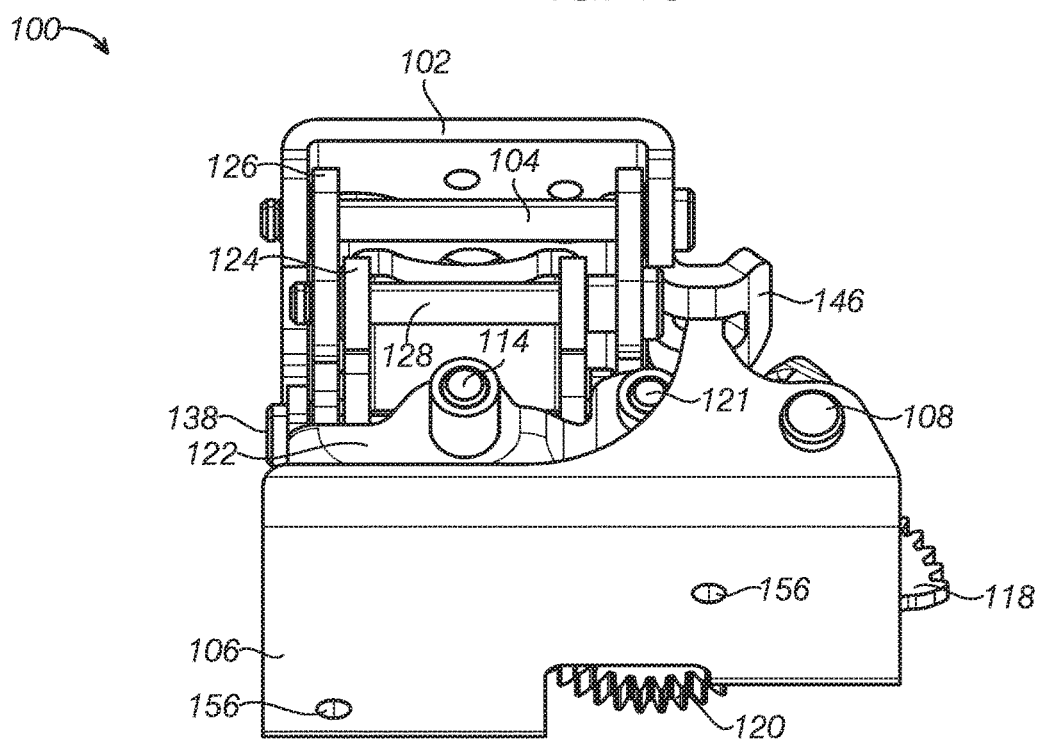
FIG. 1D is a top perspective view of the dual pivoting laterally translating hinge shown in FIG. 1A depicting the first pivot point and drive mechanism linkage arm.
Figure 2:
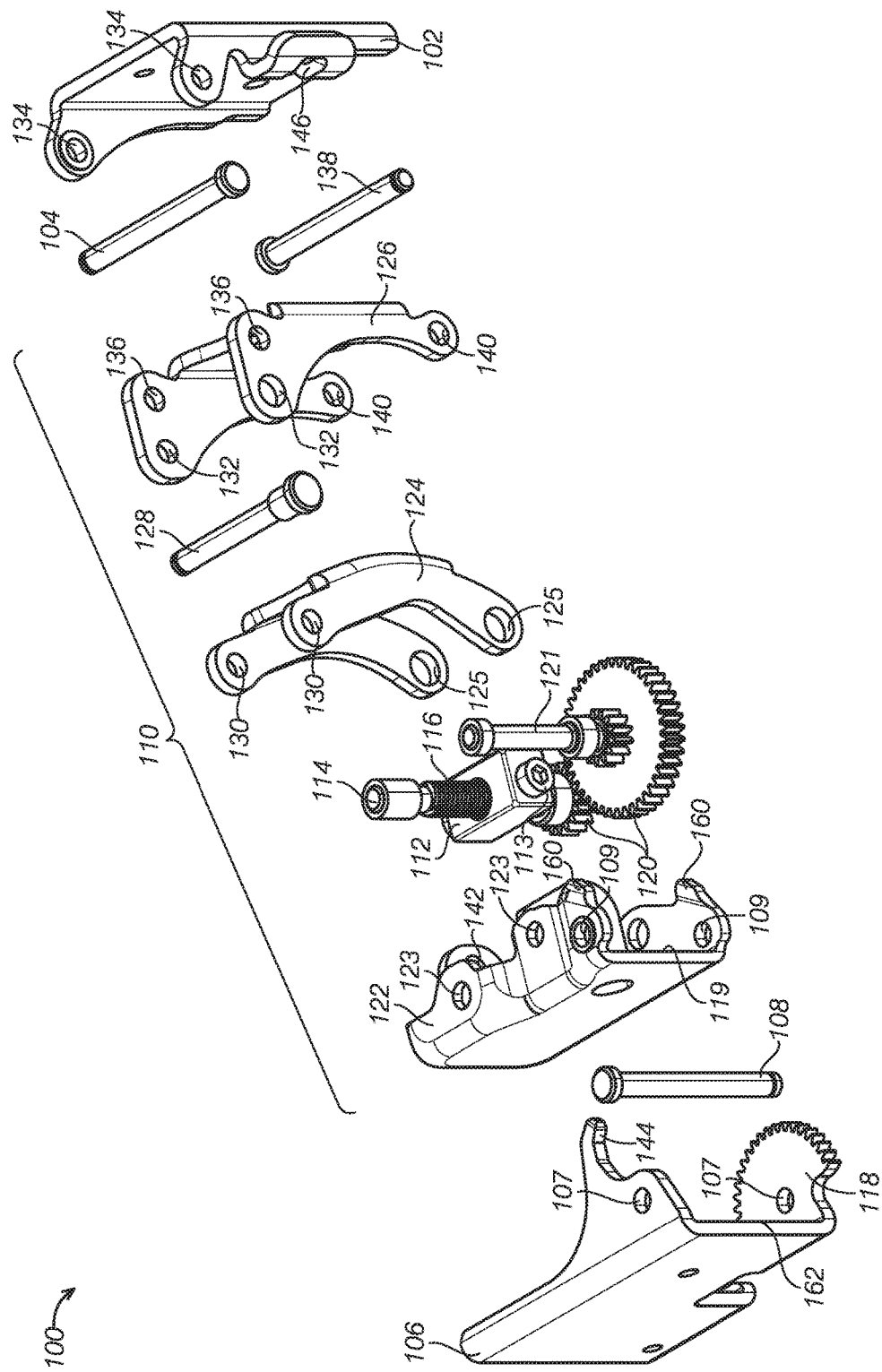
FIG. 2 is an exploded view of the dual pivoting laterally translating hinge shown in FIG. 1A depicting the various components that comprise the hinge.

With reference to FIG. 1A to 2, hinge 100 includes a first attachment plate 102 configured to secure to a first substrate such as a vehicle body or frame component. A first pivot 104 with a longitudinal axis is secured to the first attachment plate 102. A second attachment plate 106 configured to secure to a second substrate such as a vehicle door, and a second pivot 108 with a longitudinal axis oriented orthogonally from first pivot 104 longitudinal axis is secured to second attachment plate 106. Second pivot 108 is configured so that second attachment plate 106 rotates about the second pivot 108 longitudinal axis. A drive mechanism 110 is configured to rotate about the first pivot 104 longitudinal axis as it is driven, and mechanically connected to second attachment plate 106 so that second attachment plate 106 drives drive mechanism 110 as it rotates about the second pivot 108 longitudinal axis, thereby causing second attachment plate 106 to translate away from first attachment plate 102.

In the preferred embodiment, drive mechanism 110 includes a lift arm 126 with a first end 136 and a second end 140 located distal from the first end 136, first end 136 of lift arm 126 being rotatably attached to first pivot 104 so that lift arm 126 can rotate up away from the plane of first attachment plate 102. First end 136 further includes a linkage pivot point 132 and second end 140 is configured as a bracket pivot point. A linkage arm 124 with a first end 125 and a second end 130 located distal from first end 125 is rotatably attached via second end 130 to linkage pivot point 132. First end 125 of linkage arm 124 is configured as a knuckle pivot point to receive knuckle pivots 113.

A drive mechanism bracket 122 has a first end 119 rotatably secured to second pivot 108 through pivot holes 109, and a second end 142 located distal from first end 119 and rotatably secured to the bracket pivot point of second end 140. A threaded knuckle 112 is rotatably attached via knuckle pivots 113 to the knuckle pivot point of linkage arm first end 125. A threaded leadscrew 114 with a longitudinal axis is rotatably secured to drive mechanism bracket 122 and passes through knuckle 112 so that rotating leadscrew 114 causes knuckle 112 to move along the longitudinal axis of leadscrew 114. One or more gears 120 are secured to drive mechanism bracket 122 and configured to rotatably drive leadscrew 114 when second attachment plate 106 is rotatably attached to second pivot 108.

When second attachment plate 106 is secured to the second substrate, rotating the second substrate causes second attachment plate 106 to rotate about second pivot 108 and impart a rotational motion to the one or more gears 120, thereby causing leadscrew 114 to be rotatably driven.

As can be seen in FIGS. 1B and 1C, first attachment plate 102 is preferably equipped with a plurality of mounting holes 152 that can allow hinge 100 to be mounted on a variety of different substrates, accommodating multiple potential positions for mounting bolts which may necessarily vary depending upon a given vehicle or non-vehicle application. Likewise, FIGS. 1A and 1D depict second attachment plate 106 with a plurality of mounting holes 156.

These mounting holes 152 and 156 can be of a variety f different sizes and shapes, such as round, square, or polygonal, and can be located along first attachment plate 102 in a variety of different locations, depending upon the intended application for hinge 100. Furthermore, first and second attachment plates 102 and 106 need not be secured to their respective substrates using mounting holes. Any suitable means for mounting first and second attachment plates 102 and 106 can be utilized, such as clamps, pins, snaps, or another suitable method for securely attaching to a substrate, depending upon the particular intended usage of hinge 100 and the type and nature of the substrate.

First mounting plate 102 and second mounting plate 106 are depicted as roughly rectangular in shape. A skilled person in the art will appreciate that this shape is somewhat arbitrary. First and second mounting plates 102 and 106 could be configured in any specific shape that can accommodate drive mechanism 110, and so may be tailored to fit a particular application, s as a contoured surface that may be encountered in the space between a vehicle door and a vehicle's side pillar. First mounting plate 102 and second mounting plate 106 are preferably constructed from steel for most vehicular applications, but may also be constructed from materials such as composites or plastics, or any other material that is suitable to an intended application for hinge 100. They may be manufactured using any suitable technique, such as stamping, casting, or forging, for a steel bracket, or any other manufacturing method suitable to the selected construction materials.

As can be seen in the figures, first mounting plate 102 and second mounting plate 106 are approximately U-shaped in the preferred embodiment, which help provide structural rigidity and resist deformation when hinge 100 is mounted between a first and second substrate. Various features that will be discussed herein may be located on each side of the U shape.

First attachment plate 102 connects to the remainder of hinge 100, namely, drive mechanism 110, by way of first pivot 104. Likewise, second attachment plate 106 attaches to drive mechanism 110 by way of second pivot 108. First pivot 104 is implemented as a round pin that fits through first pivot mounting holes 134 located on either side of the LT-shape, along with corresponding holes on drive mechanism 110, discussed further herein. Similarly, second pivot 108 is also implemented as a pin that fits into second pivot mounting holes 107, securing through corresponding pivot holes 109 on drive mechanism bracket 122 that is part of drive mechanism 110. Although preferably implemented as a pin, first pivot 104 and second pivot 108 could be implemented using any mechanism that allows first attachment plate 102, drive mechanism 110 and second attachment plate 106 to rotate with respect to each other, such as a series of bearings, bushings or hinge points. How each pivot can be implemented will depend upon the particular usage for hinge 100.

First attachment plate 102 also includes socket 146 that is disposed along the side of first attachment plate 102. Socket 146 is configured to receive hook 144 that projects from second attachment plate 106 proximate to one of second pivot mounting holes 107. When hinge 100 is rotated to a closed configuration, the planes of first attachment plate 102 and second attachment plate 106 become substantially parallel, and hook 144 engages into socket 146 as shown in FIGS. 1C and 1D. By doing so, any load borne by second attachment plate 106 is directly transferred to first attachment plate 102 and its corresponding first substrate, and hinge 100 is held in a secured configuration from any direct lateral forces. The engagement of hook 144 into socket 146 further acts to unload drive mechanism 110 from any weight and/or torque applied to hinge 100, so as to prevent unnecessary fatiguing of drive mechanism 110. As hinge 100 is opened by second attachment plate 106 rotating away from first attachment plate 102, hook 144 disengages from socket 146, thus unlocking and freeing hinge 100.

Second pivot 108 may be equipped with a check device at the point on second attachment plate 106, specifically, second pivot mounting hole 107 that is distal from pivot drive gear 118, that can act to limit the travel of second attachment plate 106 to ensure that hinge 100 cannot be overextended. Further, s a check device can be configured to provide intermediate stops in the travel of second attachment plate 106 to allow an attached door to be rested in a partially open position where further opening of hinge 100 is either not feasible or simply undesirable for a particular time of use. Such check devices are well known in the relevant art.

Further, as depicted in FIG. 2 hinge 100 is equipped with an over open stop, implemented as projections 160 on drive mechanism bracket 122 and a corresponding surface 162 on second attachment plate 106. In operation, as second attachment plate 106 rotates about second pivot 108, surface 162 will contact projections 160 once second attachment plate 106 reaches its designed maximum travel, thereby arresting further travel of second attachment plate 106. It will be readily apparent to a person skilled in the relevant art that the maximum allowed travel of second attachment plate 106, and thus hinge 100, can be set by the choice of position of projections 160 on drive mechanism bracket 122. As depicted in FIG. 2, projections 160 are an integral part of drive mechanism bracket 122, and thus are positioned at the time drive mechanism bracket 122 is manufactured. However, projections 160 could be implemented using a separately manufactured piece that is removably attached to drive mechanism bracket 122, so that the maximum travel of second attachment plate 106 can be adjusted later in the field. In other embodiments surface 162 could be equipped with depressions or similar features positioned to interact with projections 160, where the depth of such features would determine the maximum travel of second attachment plate 106, and such maximum travel could be adjusted by making the features deeper, or taller.

Opposite from second pivot mounting hole 107 that includes hook 144 is pivot drive gear 118. Pivot drive gear 118 supplies rotational force to drive mechanism 110 via gears 120 that comprise part of drive mechanism 110.

Drive mechanism 110 connects to first pivot 104 via its lift arm 126, which secures to first pivot 104 by passing through holes on first end 136 of lift arm 126. Also on first end 136 are additional holes that form linkage pivot point 132, through which passes linkage pivot 128. Second end 140 is configured with a series of holes to form a bracket pivot point, through which bracket pivot 138 passes. Lift arm 126 is configured to transmit torque generated in drive mechanism 110 to cause hinge 100 to extend by pivoting about first pivot 104, as will be explained further herein.

This torque is generated by and transmitted from linkage arm 124, which secures to linkage pivot point 132 by linkage pivot 128 passing through second end 130 of linkage arm 124 as well as the holes of linkage pivot point 132. Linkage arm 124 includes first end 125, which has holes to receive knuckle pivots 113. Knuckle pivots 113 are disposed on opposite sides of knuckle 112. As mentioned above, knuckle 112 includes a threaded hole that is approximately centrally located along the axis of knuckle pivots 113, through which passes leadscrew 114, which has threads 116 that correspond with knuckle 112 disposed along its shaft. As leadscrew 114 rotates through knuckle 112 causing knuckle 112 to travel laterally along the length of leadscrew 114, the lateral motion is transferred to linkage arm 124 by way of knuckle pivots 113.

Leadscrew 114 includes at one end a pinion gear, which is driven by, and is part of, the set of gears 120. Gears 120 in turn driven by pivot drive gear 118 on second attachment plate 106. In the preferred embodiment, gears 120 are configured in an appropriate ratio to provide an increase in rotational speed applied to leadscrew 114. However, a person skilled in the relevant art will appreciate that the appropriate ratio will also depend on the thread pitch of leadscrew 114 and, ultimately, the amount of lateral translation that hinge 100 must provide for a given application. A coarser pitch of leadscrew 114 and/or less required lateral translation will allow for a lower drive ratio. Pivot drive gear 118 drives a small gear that is stacked atop a larger gear, which in turn drives the smaller pinion gear at the end of leadscrew 114.

A person skilled in the relevant art will appreciate that the thread pitch of leadscrew 114 and corresponding knuckle 112 will determine the amount of travel of knuckle 112 upon the shaft of leadscrew 114 with each rotation of leadscrew 114. A fine pitch will result in knuckle 112 moving a relatively small distance across the shaft of leadscrew 114 with each rotation of leadscrew 114, as compared to a coarse pitch, which will cause knuckle 112 to move a greater distance across the shaft of leadscrew 114 with a single rotation.

Drive mechanism bracket 122 secures leadscrew 114 and gears 120. A series of securing holes 123 receive the various shafts connected to gears 120 (e.g., a shaft 121 connected to one of the gears 120) as well as leadscrew 114, holding them in a fixed position while allowing rotation so that drive mechanism 110 can function reliably. Second pivot 108, passing through second pivot mounting holes 107 and pivot holes 109 ensures that drive mechanism bracket 122 and second attachment plate 106 are held rigid with respect to each other, and that second attachment plate 106 is only allowed to rotate with respect to drive mechanism bracket 122. As gears 120 are likewise held in a fixed position with respect to drive mechanism bracket 122, pivot drive gear 118 is permanently held in proper position to engage gears 120. Drive mechanism bracket 122 is secured to lift arm 126 through second end 142 of drive mechanism bracket 122, through which bracket pivot 138 passes as well as through second end 140 of lift arm 126.

With drive mechanism bracket 122 held rigid with respect to second attachment plate 106 apart from rotating about second pivot 108, as second attachment plate 106 rotates, pivot drive gear 118 rotates gears 120, which in turn causes leadscrew 114 to rotate and knuckle 112 to move up the shaft of leadscrew 114. As knuckle 112 moves up leadscrew 114, the increasing distance between the position of knuckle 112 and the base of drive mechanism bracket 122 increases, so that knuckle pivots 113 apply a linear force or load against linkage arm 124 via first end 125. This, in turn, causes linkage arm 124 to apply a force or load to lift arm 126 through linkage pivot point 132 and linkage pivot 128. As linkage arm 124 is a fixed and rigid length, a counter pressure is placed against drive mechanism bracket 122 via leadscrew 114, which in turn supplied a counter pressure to second attachment plate 106 via second pivot 108, to urge drive mechanism bracket 122 to pivot down and rotate around bracket pivot 138. Because second attachment plate 106 and, by connection, drive mechanism bracket 122 is held in a rigid vertical position by attachment to the second substrate, this pivoting portion around bracket pivot 138 is prevented. As a result, the linear load applied by linkage arm 124 to lift arm 126 creates a torque that results in lift arm 126 rotating around first pivot 104, and pivoting up and away from first attachment plate 102, causing hinge 100 to extend. Leadscrew 114 experiences axial loads in the operation of hinge 100, and so drive mechanism bracket 122 may be equipped with a thrust bearing mechanism, preferably in securing hole 123 through which leadscrew 114 protrudes, to enhance the longevity and reduce wear upon drive mechanism 110.

Figure 3A:
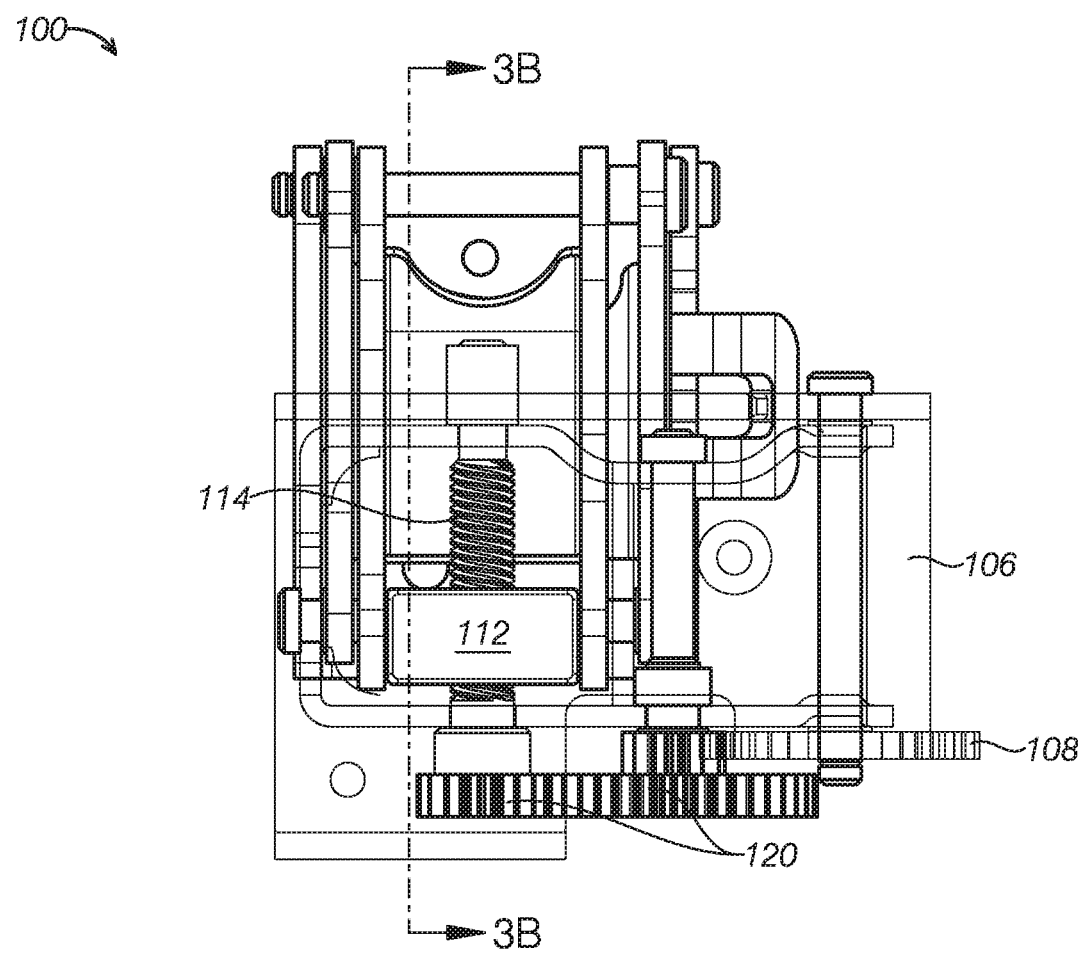
FIG. 3A is a front cutaway view of the dual pivoting laterally translating hinge shown in FIG. 1A depicting the arrangement of the internal components of the hinge drive mechanism.
Figure 3B:
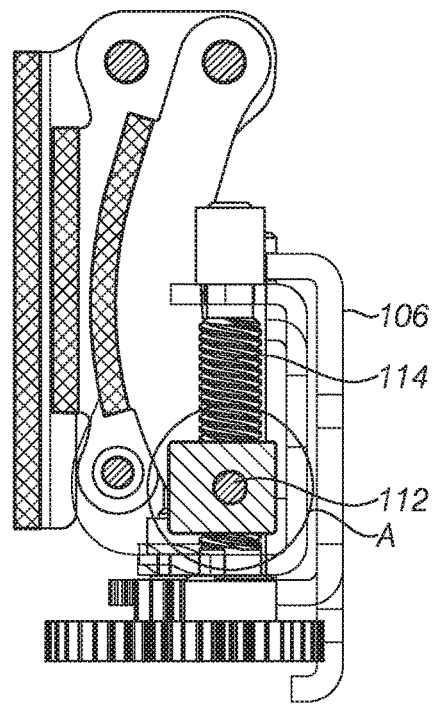
FIG. 3B is a side cross-sectional view of the dual pivoting laterally translating hinge shown in FIG. 3A along line 3B, depicting the component arrangement of the drive mechanism when the hinge is in a closed and retracted configuration.
Figure 3C:
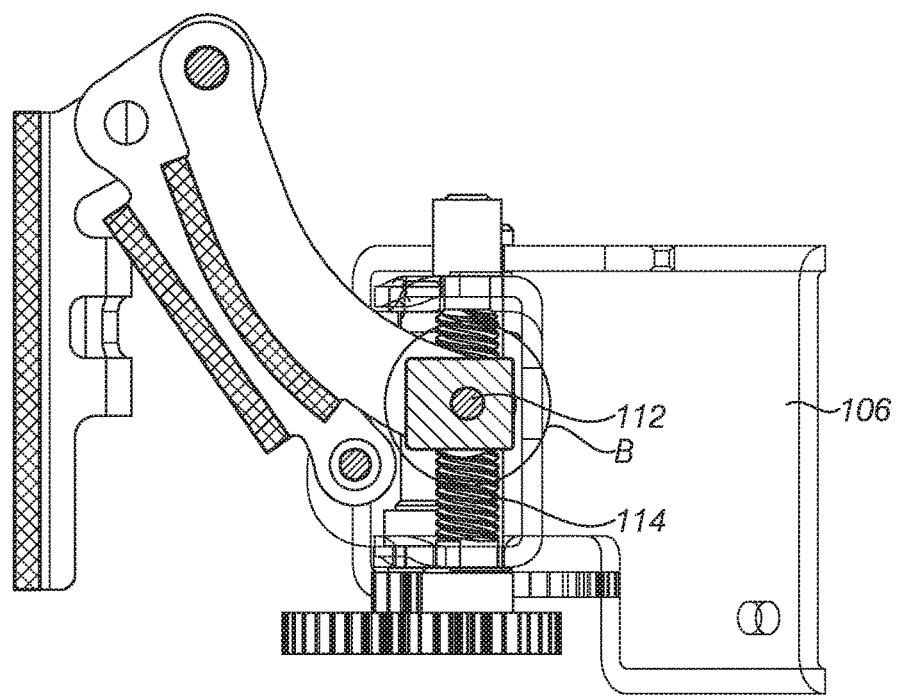
FIG. 3C is a side cross-sectional view of the dual pivoting laterally translating hinge shown in FIG. 3A along line 3B, depicting the component arrangement of the drive mechanism when the hinge is in an open and extended configuration.

Referring now to FIGS. 3A to 3C, the movement of the various components of hinge 100 as it extends can be seen. In FIG. 3A, hinge 100 is seen from a frontal view, with the position of knuckle 112 upon leadscrew 114 visible. Knuckle 112 is located proximate to the pinion at the base of leadscrew 114 as well as the base of drive mechanism bracket 122, which is covered by second attachment plate 106, shown in a closed position folded parallel to first attachment plate 102. FIG. 3B shows this configuration from a side cutaway view, with knuckle 112 in position A when hinge 100 is in a retracted configuration. FIG. 3C, in turn, depicts hinge 100 in an extended position, with second attachment plate 106 rotated out away from hinge 100. As it is rotated, pivot drive gear 118, engaged with gears 120, turns leadscrew 114 and moves knuckle 112 to position B. In position B, knuckle 112 is closer to the top of drive mechanism bracket 112. The increased distance created between knuckle 112 and the bottom of drive mechanism bracket 122, depicted in position 13, has created a torque through lift arm 126 around first pivot 104. Hinge 100 is moved to the extended configuration shown in FIG. 3C, with second attachment plate 106 being moved laterally away from first attachment plate 102 as it rotates.

The overall extension of hinge 100 can be tailored by varying the geometry created by lift arm 126, linkage arm 124, the thread pitch of knuckle 112 and leadscrew 114, and the amount of rotations of leadscrew 114 relative to the rotation of second attachment plate 106, which itself is determined by the gear ratios provided by gears 120. For example, providing a coarser thread pitch for knuckle 112 and leadscrew 114 will generally result in a greater extension of hinge 100 due to the greater travel distance of knuckle 112 upon the shaft of leadscrew 114, when compared to a finer thread pitch, all other variables being held equal. Likewise, for a given thread pitch of knuckle 112 and leadscrew 114, increasing the ratio of gears 120 so that leadscrew 114 is rotated a greater amount for a given travel of second attachment plate 106 will likewise result in a greater extension of hinge 100. Still further, increasing the distance on lift arm 126 between where first pivot 104 connects to first end 136 and linkage pivot point 132, creates a greater ever distance over where force applied by linkage arm 124 is converted to a torque on lift arm 126. This greater distance likewise will reduce the extension distance of hinge 100, but allow hinge 100 to apply a greater torque, thus enabling hinge 100 to support and translate a heavier load. A person skilled in the relevant art will appreciate that these various geometries can be varied to tailor the extension characteristics of hinge 100 to suite a particular application, e.g. vehicles with different widths of doors and bodies, different needed clearance and/or desired rotational travel of a door, etc.

Figure 4A:
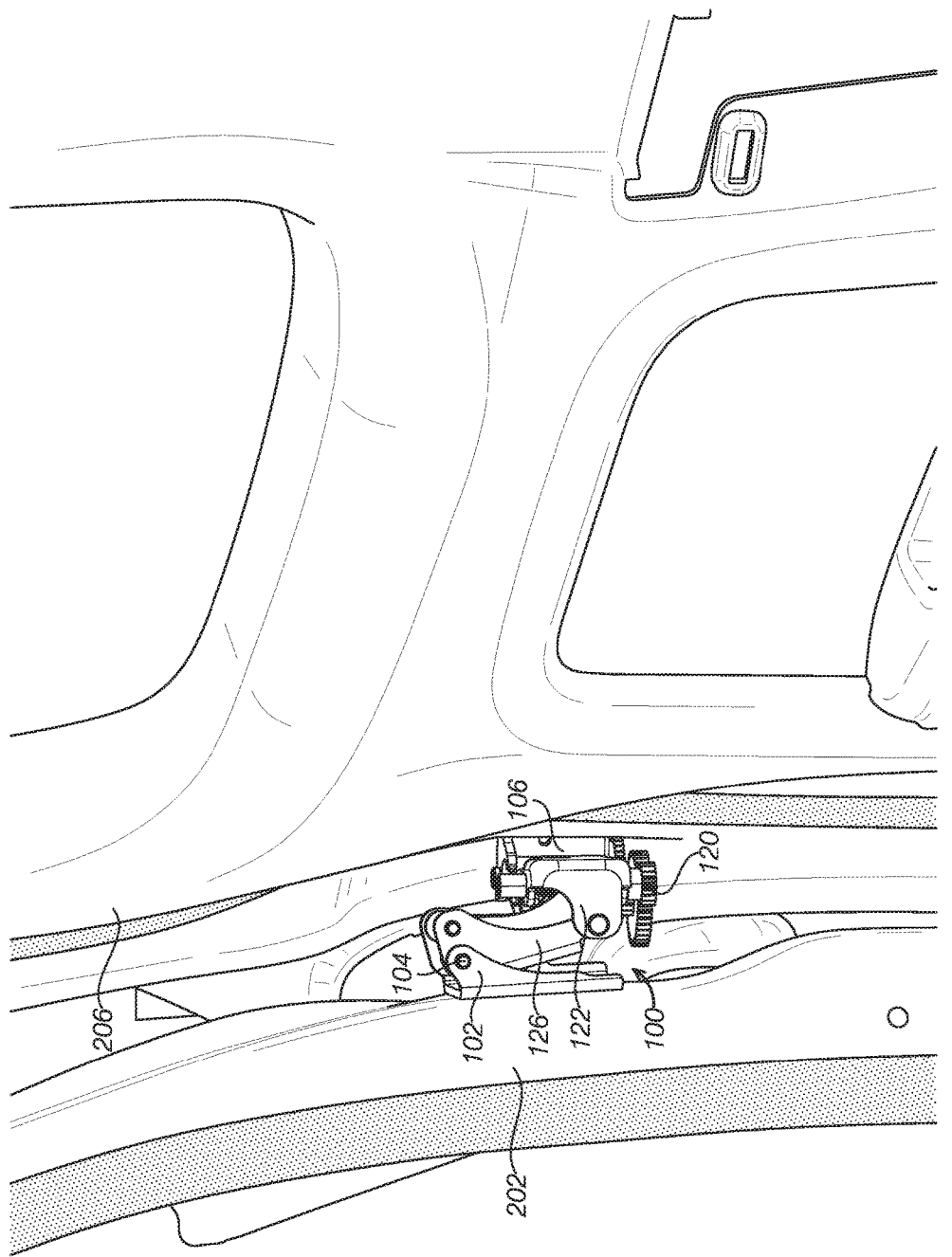
FIG. 4A is a side perspective view of the dual pivoting laterally translating hinge shown in FIG. 1A depicting the hinge as installed to secure a vehicle door to the vehicle body, with the door partially open.
Figure 4B:
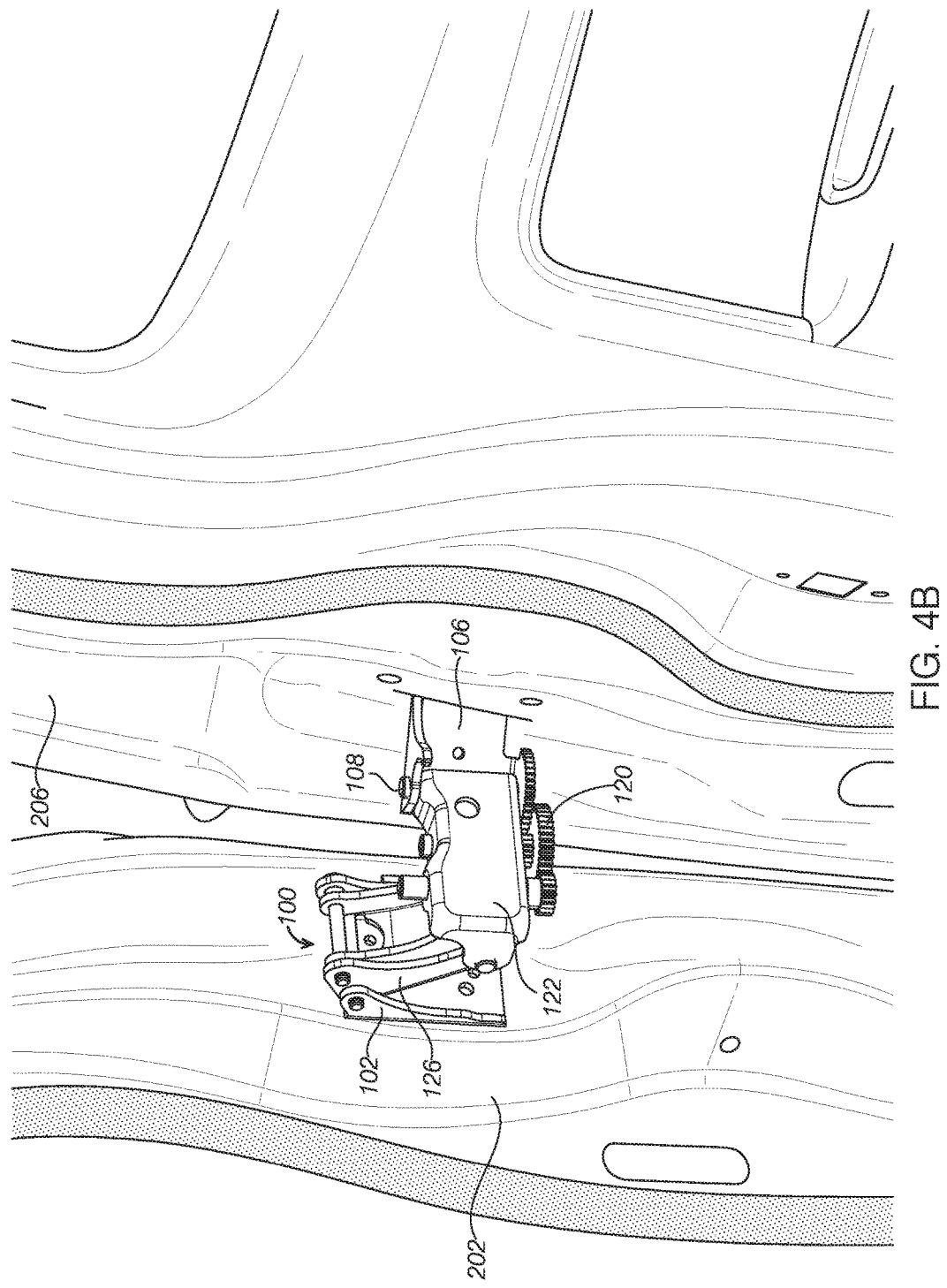
FIG. 4B is a side perspective view of the dual pivoting laterally translating hinge shown in FIG. 4A depicting the hinge with the door in a more fully open position.

FIGS. 4A and 4B depict hinge 100 in the context of a vehicle, where the first substrate is a portion of a vehicle frame 202, and the second substrate is a vehicle door 206. FIG. 4A shows the hinge 100 in a nearly retracted position, with door 206 slightly ajar, having rotated to slightly extend hinge 100. As can be seen, hinge 100 requires no penetration into frame 202. FIG. 4B shows door 206 nearly open, with hinge 100 in a nearly fully extended configuration.

Finally, FIG. 5 shows an overhead view of hinge 100 in a mostly extended configuration. Of particular note is the spacing 210 between frame 202 and the edge of door 206. With door 206 in a position of nearly 135 degrees from a closed position, spacing 210 between frame 202 and door 206 illustrates how the lateral translation provided by hinge 100 during the rotation of door 206 has allowed door 206 to easily clear the side of frame 202 with door 206 well past 90 degrees. Without this spacing 210, door 206 would be prevented from opening greater than 90 degrees by the adjacent part of frame 202 to the right of door 206.

Figure 6A:
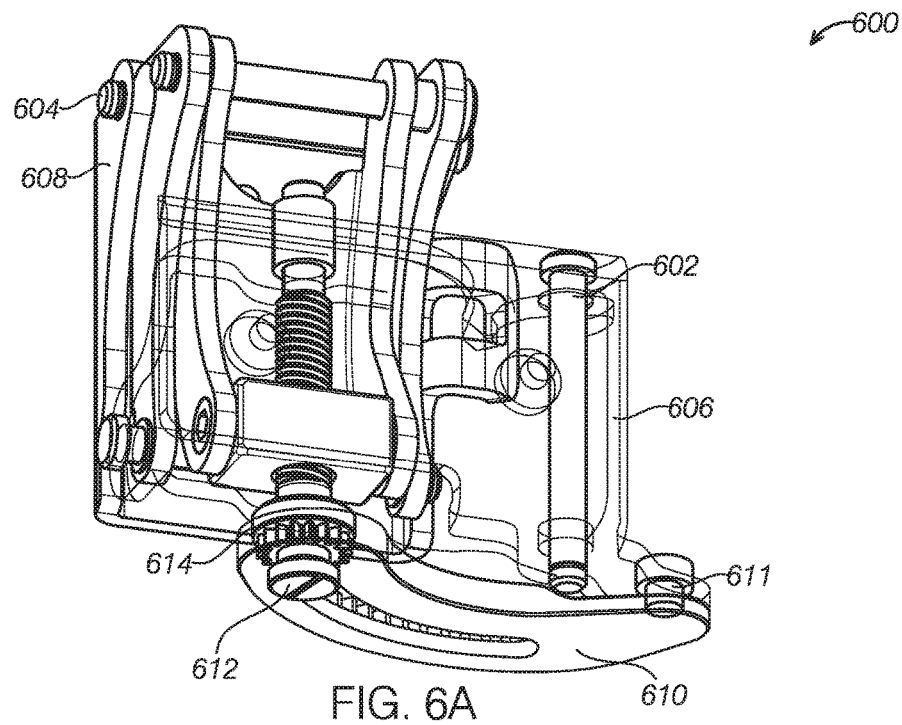
FIG. 6A is a perspective view of a second example of a dual pivoting laterally translating hinge including a drive mechanism implemented using a rack and pinion, with the hinge depicted in a retracted configuration.
Figure 6B:
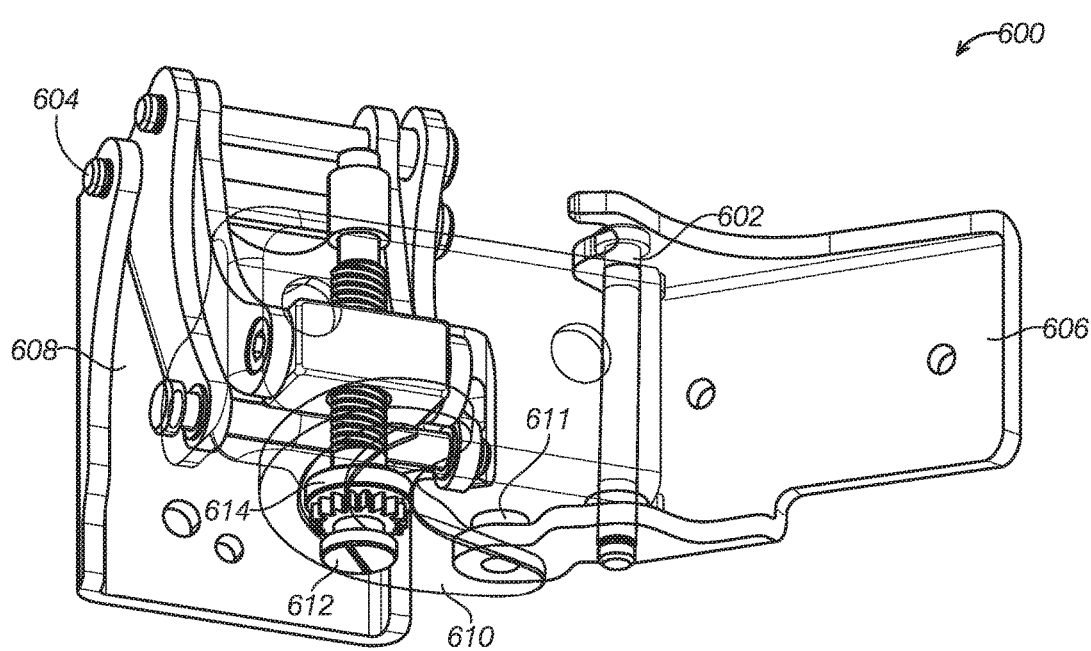
FIG. 6B is a perspective view of the dual pivoting laterally translating hinge shown in FIG. 6A, depicting the hinge in an extended configuration.

Turning attention to FIGS. 6A and 6B, a second example of a dual pivoting laterally translating hinge, hinge 600, will now be described. Hinge 600 includes many similar or identical features to hinge 100. Thus, for the sake of brevity, each feature of hinge 600 will not be redundantly explained. Rather, key distinctions between hinge 600 and hinge 100 will be described in detail and the reader should reference the discussion above for features substantially similar between the two hinges. The chief difference between hinge 100 and hinge 600 is a different implementation of the drive mechanism.

As can be seen in FIGS. 6A and 6B, a majority of the components of hinge 600 are identical to hinge 100, including the primary components of drive mechanism 110, apart from gears 120. Hinge 600 includes a first attachment plate 608, which is attached to a first pivot 604. A second attachment plate 606 is likewise attached to a second pivot 602. In contrast to second attachment plate 106 with its associated pivot drive gear 118 for actuating drive mechanism 110, second attachment plate 606 includes a lever projection 611 that includes a pivot point, which in turn moves rack 610. Rack 610 includes a plurality of cogs that engage with pinion 614, attached to the base of hinge 600's leadscrew, which corresponds with and is otherwise identical to leadscrew 114. Pinion 614 is secured to the leadscrew with a retaining bolt 612, as depicted in FIGS. 6A and 6B. This is merely one possible way to secure rack 610 to pinion 614 that ensures a secure sliding fit to the rack. Examples of means of securing pinion 614 to the leadscrew may include a press fit, welding or adhesives, threads within pinion 614 that engage corresponding threads on the leadscrew so that pinion 614 can be tightened in place, or designing pinion 614 as an integral machined portion of the leadscrew. Employing rack 610 allows the elimination of gears 120 and the simplification of the drive mechanism in hinge 600 compared to the drive mechanism 110 of hinge 100.

FIG. 6A depicts hinge 600 in a retracted position, and as can be seen, rack 610 is positioned at the end of its travel. FIG. 6B depicts hinge 600 in an extended position. As second attachment plate 606 pivots out away from first attachment plate 608, lever projection 611, which is disposed upon second attachment plate 606 on the opposite side of second pivot 602, swings in towards first attachment plate 608. As it does so, rack 610 pivots on lever projection 611 and moves in a direction away from the swing of second attachment plate 606, thereby imparting a rotational motion to pinion 614, which in turn causes the leadscrew to drive the knuckle up, and move hinge 600 into an extended configuration. This operation is otherwise identical to the extension and retraction of hinge 100.

Figure 7A:
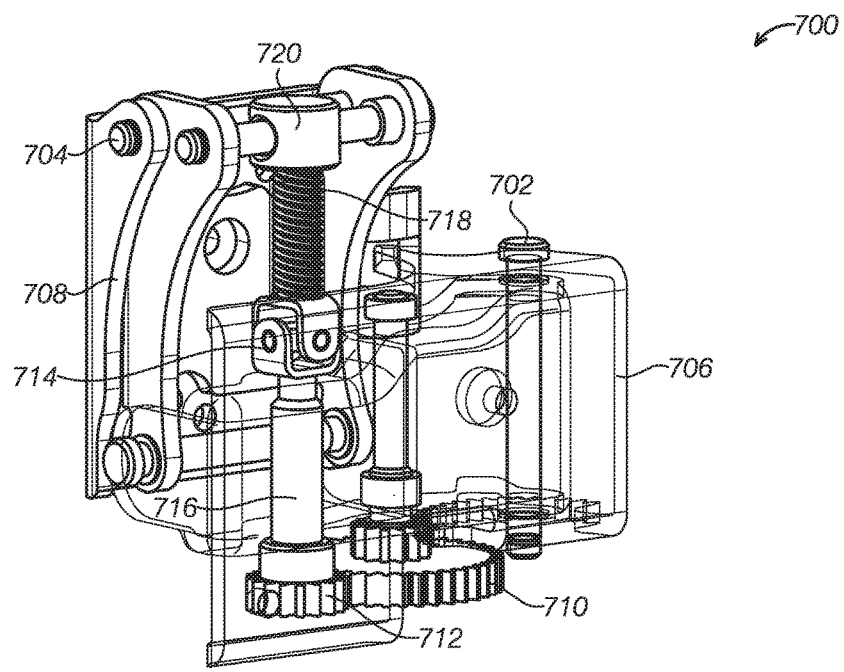
FIG. 7A is a perspective view of a third example of a dual pivoting laterally translating hinge including a drive mechanism implemented using a jackscrew and a universal joint, with the hinge depicted in a retracted configuration.
Figure 7B:
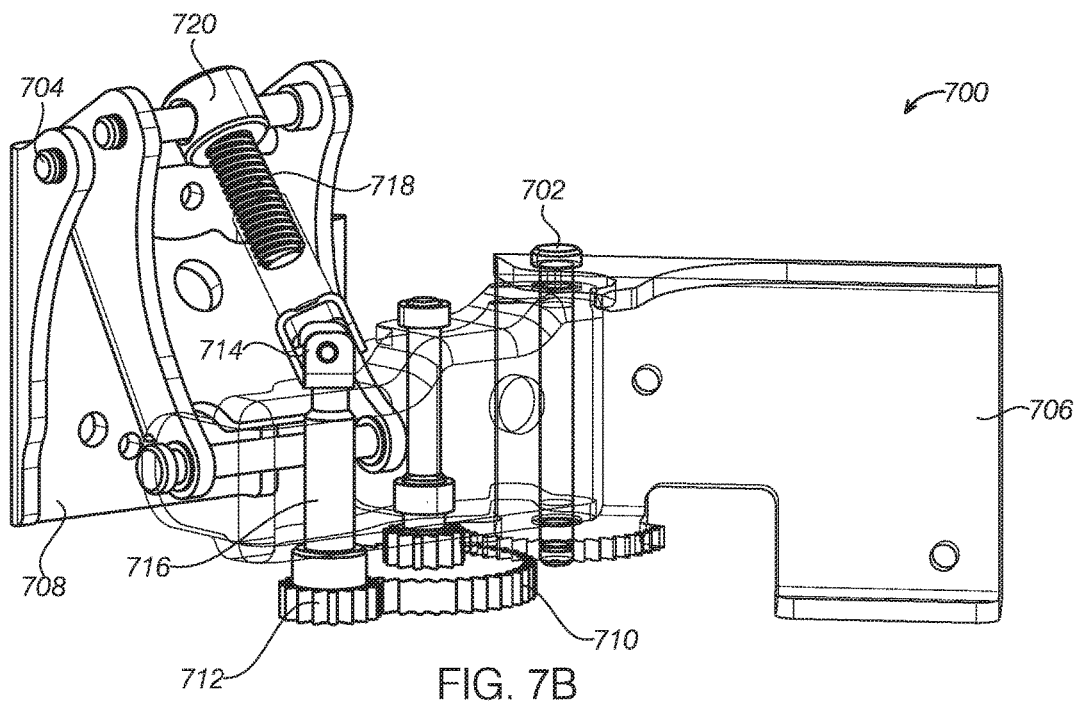
FIG. 7B is a perspective view of the dual pivoting laterally translating hinge shown in FIG. 7A, depicting the hinge in an extended configuration.

Turning attention to FIGS. 7A and 7B, a third example of a dual pivoting laterally translating hinge, hinge 700, will now be described. Hinge 700 includes many similar or identical features to hinge 100. Thus, for the sake of brevity, each feature of hinge 700 will not be redundantly explained. Rather, key distinctions between hinge 700 and hinge 100 will be described in detail and the reader should reference the discussion above for features substantially similar between the two hinges. The chief difference between hinge 100 and hinge 700 is another different implementation of the drive mechanism.

As can be seen in FIGS. 7A and 7B, hinge 700 includes a first attachment plate 708 attached to a first pivot 704, and a second attachment plate 706 that is attached to second pivot 702. These components function the same as their corresponding parts in hinge 100. Hinge 700 also includes one or more gears 710 driven by the rotation of second attachment plate 706 as in hinge 100. These gears 710 in turn drive a pinion 712, which is attached to a shaft 716 that turns a jackscrew 718 through a universal or constant velocity joint 714. Jackscrew 718 is comprised of a threaded portion which moves in and out of a corresponding sleeve. Jackscrew 718 in turn is attached to a pivoting hinge 720, which itself is secured to first attachment plate 708. Missing from hinge 700 is a linkage arm attached to a knuckle, which have been replaced by the jackscrew assembly.

FIG. 7A depicts hinge 700 in a retraced configuration, and FIG. 7B depicts hinge 700 extended. As second attachment plate 706 rotates away from first attachment plate 708, gears 710 drive pinion 712, shaft 716 and universal joint 714, which causes the threaded portion of jackscrew 718 to unscrew from the sleeve, increasing the overall length of the jackscrew. As it increases, it pushes against first attachment plate 706 and applies an opposite load against hinge 700's drive mechanism bracket, causing the lift arm to be lifted away from first attachment plate 708, as depicted in FIG. 7B. As with the knuckle and leadscrew combination, changing the thread pitch of the threaded portion and sleeve of jackscrew 718 will change the amount that the length of jackscrew 718 increases with each rotation of pinion 712, similar to changing the gear ratio of gears 710, thus allowing the amount and rate of extension of hinge 700 to be tailored as needed to various applications.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions, Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A hinge, comprising:
   a first attachment plate configured to secure to a first substrate;
   a first pivot with a longitudinal axis secured to the first attachment plate;
   a second attachment plate configured to secure to a second substrate;
   a second pivot with a longitudinal axis oriented orthogonally from the longitudinal axis of the first pivot and secured to the second attachment plate, the second pivot configured so that the second attachment plate rotates about the longitudinal axis of the second pivot; and
   a drive mechanism mechanically connected to the second attachment plate and the first pivot, and configured to impart a load to the first pivot to cause a rotation of the first pivot as the second attachment plate rotates so that a force resulting from a rotation of the first pivot causes the second attachment plate to translate away from the first attachment plate.

2. The hinge of claim 1, wherein the drive mechanism includes a plurality of intermeshing gears to mechanically connect the first pivot with the second pivot, and the rotation of the second attachment plate is imparted to the first pivot via the plurality of intermeshing gears.

3. The hinge of claim 1, wherein the drive mechanism further comprises:
   a knuckle mechanically attached to the first pivot; and
   a leadscrew engaged with the knuckle and mechanically connected to the second pivot via a plurality of intermeshing gears so that the leadscrew rotates within the knuckle as the second attachment plate rotates, causing the knuckle to move along a leadscrew longitudinal axis of rotation.

4. The hinge of claim 3, wherein the knuckle is rotatably attached to a first end of a linkage arm, the linkage arm further having a second end distal from the first end, where the second end is mechanically attached to the first pivot.

5. The hinge of claim 4, wherein the second end of the linkage arm is rotatably attached to a lift arm with a first end and a second end located distal from the first end, the lift arm being rotatably attached to the first pivot on the first end of the lift arm.

6. The hinge of claim 5, wherein the drive mechanism further comprises a drive mechanism bracket, the drive mechanism bracket having a first bracket end rotatably attached to the second pivot, and a second bracket end distal from the first bracket end rotatably attached to the second end of the lift arm.

7. The hinge of claim 6, wherein:
the first attachment plate further comprises a socket; and
the second attachment plate further comprises a hook,
wherein the hook engages into the socket when the second attachment plate is brought into a parallel position with the first attachment plate.

8. The hinge of claim 3, wherein the drive mechanism is further comprised of a plurality of gears, with one of the plurality of gears being mechanically connected to the second attachment plate, and a second one of the plurality of gears being mechanically connected to the leadscrew.

9. The hinge of claim 3, wherein the drive mechanism is further comprised of a rack that is mechanically connected to the second attachment plate, and a pinion that is mechanically connected to the leadscrew, wherein rotating the second attachment plate causes the rack to rotate the pinion.

10. The hinge of claim 1, wherein the drive mechanism is further comprised of a jackscrew with a first end mechanically attached to the first attachment plate and a second end attached to a universal joint; and the universal joint is mechanically attached to the second attachment plate.

11. A hinge for securing a door to a substrate, comprising:
a first attachment plate secured to the substrate;
a second attachment plate secured to the door;
a first pivot with a longitudinal axis mechanically attached to the first attachment plate so that the longitudinal axis of the first pivot is substantially parallel to a plane of the first attachment plate;
a lift arm with a first end and a second end located distal from the first end, the first end of the lift arm being rotatably attached to the first pivot so that the lift arm rotates up away from the plane of the first attachment plate, the first end further including a linkage pivot point and the second end further including a bracket pivot point;
a linkage arm with a first end and a second end located distal from the first end, the first end being rotatably attached to the linkage pivot point and the second end including a knuckle pivot point;
a drive mechanism comprised of:
  a drive mechanism bracket with a first end rotatably secured to a second pivot, the second pivot having a longitudinal axis oriented orthogonal from the first pivot longitudinal axis of the first pivot, and a second end located distal from the first end and rotatably secured to the bracket pivot point;
  a threaded knuckle rotatably attached to the knuckle pivot point;
  a threaded leadscrew with a longitudinal axis, rotatably secured to the drive mechanism bracket and passing through the knuckle so that rotating the leadscrew causes the knuckle to move along the longitudinal axis of the leadscrew; and
  one or more gears secured to the drive mechanism bracket and configured to rotatably drive the leadscrew; and
wherein the second attachment plate is rotatably attached to the second pivot and is configured so that rotating the door causes the second attachment plate to rotate about the second pivot and impart a rotational motion to the one or more gears, thereby causing the leadscrew to be rotatably driven, and thereby further causing a load to be placed upon the lift arm, resulting in a torque that causes the lift arm to rotate away from the plane of the first attachment plate.

12. The hinge of claim 11, wherein:
the first attachment plate further comprises a socket; and
the second attachment plate further comprises a hook,
wherein the hook engages into the socket when the door is brought into a closed position against the substrate.

13. The hinge of claim 11, wherein the one or more gears are comprised of a rack that is mechanically attached to the second attachment plate, and a pinion that is attached to the leadscrew.

14. A vehicle, comprising:
a vehicle body;
a vehicle door movably secured to the vehicle body by at least two hinges, each hinge further comprising:
  a first attachment plate secured to the vehicle body with a first pivot;
  a drive mechanism with a second pivot oriented orthogonally from the first pivot, the drive mechanism being rotatably attached to the first pivot; and
  a second attachment plate secured to the vehicle door and rotatably attached to the second pivot, the second attachment plate configured to drive the drive mechanism when the second attachment plate rotates;
wherein rotating the door causes the second attachment plate of each hinge to rotate about the corresponding second pivot, causing the vehicle door to move laterally relative to the vehicle body as it rotates.

15. The vehicle of claim 14, wherein the drive mechanism is comprised of:
a lift arm with a first end and a second end located distal from the first end, the first end of the lift arm being rotatably attached to the first pivot so that the lift arm rotates up away from a plane of the first attachment plate when a load is placed upon the first end of the lift arm, the first end further including a linkage pivot point and the second end further including a bracket pivot point;
a linkage arm with a first end and a second end located distal from the first end, the second end being rotatably attached to the linkage pivot point and the first end including a knuckle pivot point;
a drive mechanism bracket with a first end rotatably secured to the second pivot, the second pivot having a longitudinal axis oriented orthogonal from a longitudinal axis of the first pivot, and a second end located distal from the first end and rotatably secured to the bracket pivot point;
a threaded knuckle rotatably attached to the knuckle pivot point; and
a threaded leadscrew with a longitudinal axis, rotatably secured to the drive mechanism bracket and passing through the knuckle so that rotating the leadscrew causes the knuckle to move along the longitudinal axis of the leadscrew, imposing a load upon the lift arm via the linkage arm, and thereby causing the lift arm to rotate away from the plane of the first attachment plate.

16. The vehicle of claim 15, wherein the drive mechanism further comprises one or more gears secured to the drive mechanism bracket and configured to rotatably drive the leadscrew.

17. The vehicle of claim 16, wherein the second attachment plate rotating about the second pivot imparts a rotational motion to one of the one or more gears, thereby causing the leadscrew to be rotated.

18. The vehicle of claim 15, wherein the drive mechanism further comprises a rack that is mechanically attached to the second attachment plate, and a pinion that is attached to the leadscrew, wherein rotating the second attachment plate about the second pivot causes the leadscrew to be rotated.

19. The vehicle of claim 14, wherein the drive mechanism further comprises a jackscrew with a first end mechanically attached to the first attachment plate and a second end attached to a universal joint; the universal joint is mechanically attached to the second attachment plate; and rotating the second attachment plate imparts a rotational motion to the universal joint, causing the jackscrew to change in length.

20. The vehicle of claim 14, wherein the first attachment plate further comprises a socket; and the second attachment plate further comprises a hook, wherein the hook engages into the socket when the door is brought into a closed position against the vehicle body.

\* \* \* \* \*